Patented June 8, 1954

2,680,760

UNITED STATES PATENT OFFICE 2,680,760

TETRAMETHYLDIAMIDOPHOSPHORIC O-ALKYL ETHANEPHOSPHONIC ANHYDRIDES

Henry Tolkmith, Midland, Mich., assignor to The Dow Chemical Company, Midland, Mich., a corporation of Delaware No Drawing. Application February 27, 1953, Serial No. 339,457

3 Claims. (Cl. 260—461)

The present invention is directed to the tetramethyldiamidophosphoric O - alkyl ethanephosphonic anhydrides of the following formula

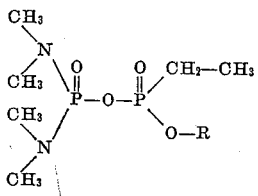

In this and succeeding formulae, R represents methyl or ethyl. These compounds are viscous liquids somewhat soluble in many organic solvents and water. They are of value as intermediates for the preparation of more complex phosphorus derivatives and as toxic constituents of parasiticide compositions.

The new compounds may be prepared by reacting together tetramethyldiamidophosphoric chloride and an O,O-dialkyl ethanephosphonate of the following formula

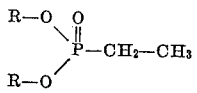

The amount of the reactants to be employed is not critical, some of the desired product being produced with any proportion of ingredients. In practice, optimum yields are obtained when employing substantially equimolecular proportions of the reagents.

The reaction involves a condensation resulting in the formation of alkyl chloride. In practice, substantially all the chlorine in the tetramethyldiamidophosphoric chloride may be recovered as alkyl chloride (RCl). The reaction takes place smoothly at the temperature range of from about 90° to 190° C., and at a rate which varies directly with the employed temperature. Since the desired products have a tendency to decompose at temperatures in excess of 190° C., such elevated reaction temperatures should not be employed for any appreciable period of time. If desired, the reaction may be carried out in an inert organic solvent such as toluene and xylene.

In carrying out the reaction, the tetramethyldiamidophosphoric chloride and O,O - dialkyl ethanephosphonate are mixed together and the resulting dispersion heated at a temperature of from 90° to 190° C. until the evolution of alkyl chloride of reaction is substantially complete. Upon completion of the reaction, the mixture may be distilled under reduced pressure and under 190° C. to separate low boiling constituents and to obtain as a residue the desired tetramethyldiamidophosphoric O-alkyl ethanephosphonic anhydride.

The following examples illustrate the invention but are not to be construed as limiting:

Example 1

20.3 grams (0.12 mole) of tetramethyldiamidophosphoric chloride and 16.4 grams (0.12 mole) of O,O-dimethyl-ethanephosphonate were mixed together and the resulting dispersion heated at a temperature of about 125° C. until the evolution of methyl chloride of reaction was substantially complete. The heating was carried out with stirring and over a period of about 2 hours. During the heating, methyl chloride was separated and recovered from the reaction zone as formed. The reaction mixture was then heated under reduced pressure at gradually increasing temperatures up to a temperature of 125° C. at 40 millimeters pressure to separate low boiling constituents and to obtain as a residue a tetramethyldiamidophosphoric O-methyl ethanephosphonic anhydride product. The latter was a viscous liquid having a density of 1.1897 at 20° C., a refractive index $n/D$ of 1.4592 at 20° C. and a nitrogen content of 11.03 percent.

Example 2

19 grams (0.11 mole) of tetramethyldiamidophosphoric chloride and 18.5 grams (0.11 mole) of O,O-diethyl ethanephosphonate were mixed together and the resulting dispersion heated at a temperature of about 125° C. until the evolution of ethyl chloride of reaction was substantially complete. The heating was carried out with stirring and over a period of about 0.5 hour. During the heating, ethyl chloride was separated and recovered from the reaction zone as formed. The reaction mixture was then heated under reduced pressure and at gradually increasing temperatures up to a temperature of 125° C. at 40 millimeters pressure to separate low boiling constituents and to obtain as a residue a tetramethyldiamidophosphoric O-ethyl ethanephosphonic anhydride product. The latter was a viscous oil having a density of 1.2092 at 20° C. and a refractive index $n/D$ of 1.4628 at 20° C.

The new tetramethyldiamidophosphoric O-alkyl ethanephosphonic anhydride products are effective as parasiticides and adapted to be employed for the control of a wide range of agricultural and household pests such as mites and aphids. For such use, the compounds may be dispersed on an inert finely divided solid and employed as dusts. Also, such mixtures may be dispersed in water with or without the aid of a dispersing and wetting agent and the resulting aqueous compositions employed as sprays. In other procedures the new products may be employed in oils, as constituents in oil-in-water emulsions or in aqueous dispersions. Suitable concentrations of the toxicant in dusts are in the order of from about 0.1 to 10 per cent by weight of the dust and in liquid spray compositions from about 0.1 to 3 pounds per 100 gallons of the spray mixture.

In representative operations, the products of the preceding examples were employed for the control of 2-spotted spider mites. Against this organism 100 per cent kills were obtained with aqueous spray compositions containing 1 pound of toxicant per 100 gallons of solution.

I claim:
1. A tetramethyldiamidophosphoric O-alkyl ethanephosphonic anhydride of the formula

$$\begin{array}{c} CH_3 \\ \diagdown N \diagup \\ CH_3 \diagup \phantom{N} \diagdown \\ \phantom{CH_3}\diagdown P \diagup O \phantom{-} \phantom{P} \phantom{-} O \phantom{-} CH_2-CH_3 \\ CH_3 \diagup \phantom{N}\diagdown \\ \diagup N \diagdown \\ CH_3 \end{array}$$

wherein R represents a member of the group consisting of methyl and ethyl.
2. Tetramethyldiamidophosphoric O - methyl ethanephosphonic anhydride.
3. Tetramethyldiamidophosphoric O-ethyl ethanephosphonic anhydride.

No references cited.